US010230514B2

(12) United States Patent
Park

(10) Patent No.: US 10,230,514 B2
(45) Date of Patent: Mar. 12, 2019

(54) METHOD AND APPARATUS FOR SYNCHRONIZED HANDOVER IN MOBILE COMMUNICATION SYSTEM

(71) Applicant: ELECTRONICS AND TELECOMMUNICATIONS RESEARCH INSTITUTE, Daejeon (KR)

(72) Inventor: Hyun Seo Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/341,664

(22) Filed: Nov. 2, 2016

(65) Prior Publication Data

US 2017/0127334 A1 May 4, 2017

(30) Foreign Application Priority Data

Nov. 3, 2015 (KR) .................. 10-2015-0153971
Nov. 5, 2015 (KR) .................. 10-2015-0155401
Nov. 2, 2016 (KR) .................. 10-2016-0144972

(51) Int. Cl.
*H04W 36/02* (2009.01)
*H04L 5/00* (2006.01)
*H04W 76/27* (2018.01)
*H04W 36/00* (2009.01)

(52) U.S. Cl.
CPC ......... *H04L 5/0055* (2013.01); *H04W 36/023* (2013.01); *H04W 36/0072* (2013.01); *H04W 76/27* (2018.02)

(58) Field of Classification Search
CPC .......................... H04W 36/02; H04W 36/023
See application file for complete search history.

(56) References Cited

U.S. PATENT DOCUMENTS 8,509,791 B2 8/2013 Damnjanovic
9,313,699 B2 4/2016 Kim et al.
2007/0293224 A1* 12/2007 Wang ............... H04W 36/0055
455/436

(Continued)

FOREIGN PATENT DOCUMENTS

KR 10-2014-0049455 A 4/2014
KR 10-1493456 B1 2/2015

OTHER PUBLICATIONS

3GPP TSG-RAN WG2 #92, R2-156412, Synchronized Handover for Latency Reduction, Anaheim, USA, Nov. 16-20, 2015.

(Continued)

*Primary Examiner* — Christopher M Brandt
(74) *Attorney, Agent, or Firm* — Rabin & Berdo, P.C.

(57) ABSTRACT

A method and an apparatus for synchronized handover in a mobile communication system are provided. A source base station providing data to a terminal transmits a handover command message for handover to a target base station to the terminal, and interrupts transmission of data to the terminal when the source base station receives a message for informing a handover execution timing from the terminal later. In addition, the source base station forwards data on the terminal to the target base station.

16 Claims, 6 Drawing Sheets

(56) References Cited

U.S. PATENT DOCUMENTS

| | | | |
|---|---|---|---|
| 2010/0240375 A1* | 9/2010 | Ahluwalia | H04L 5/0053 455/439 |
| 2011/0058529 A1* | 3/2011 | Uemura | H04W 36/0077 370/331 |
| 2012/0021747 A1 | 1/2012 | Brandt et al. | |
| 2015/0038148 A1* | 2/2015 | Park | H04W 36/0055 455/437 |
| 2015/0181493 A1 | 6/2015 | Park et al. | |
| 2015/0358864 A1 | 12/2015 | Park et al. | |
| 2016/0007261 A1 | 1/2016 | Oh et al. | |
| 2016/0198375 A1* | 7/2016 | Sundberg | H04L 5/1469 370/280 |
| 2017/0013519 A1* | 1/2017 | Hahn | H04W 36/0077 |

OTHER PUBLICATIONS

3GPP TSG-RAN WG2 Meeting #92, R2-156202, Report of email discussion [91bis#35][LTE/LATRED] Handover evaluations and solutions, Intel Corporation, Anaheim, California, Nov. 16-20, 2015.

* cited by examiner

METHOD AND APPARATUS FOR SYNCHRONIZED HANDOVER IN MOBILE COMMUNICATION SYSTEM

CROSS-REFERENCE TO RELATED APPLICATION

This application claims priority to and the benefit of Korean Patent Application Nos. 10-2015-0153971, 10-2015-0155401 and 10-2016-0144972 filed in the Korean Intellectual Property Office on Nov. 3, 2015, Nov. 5, 2015 and Nov. 2, 2016, the entire contents of which are incorporated herein by reference.

BACKGROUND OF THE INVENTION (a) Field of the Invention

The present invention relates to a method and an apparatus for handover. More particularly, the present invention relates to a method and an apparatus for synchronized handover.

(b) Description of the Related Art

Generally, in a mobile communication system, handover is executed in the case in which a base station accessed by a terminal is changed due to movement of the terminal. In the case in which the handover is generated due to the movement of the terminal, an interruption time in which the terminal does not receive data occurs during a period in which the terminal is disconnected from a source base station and is connected to a target base station. In order to reduce the interruption time, a method for handover of maintaining connection between the terminal and the source base station during the handover and disconnecting the terminal from the source base station after connection between the terminal and the target base station is completed has been discussed.

However, the source base station transmits data to the terminal while forwarding data to the target base station in a state in which it does not know a handover operation situation of the terminal. Since the source base station may not know when the terminal is handed over to the target base station in this situation, the source base station forwards unnecessary data to the target base station, such that resources between the base stations may be wasted. In addition, in spite of a state in which the terminal is handed over to the target base station, the source base state transmits data to the terminal, such that radio resources may be wasted.

SUMMARY OF THE INVENTION

The present invention has been made in an effort to provide a method and an apparatus for handover having advantages of allowing a time point in which a terminal executes handover from a source base station to a target base station to be known by all of the terminal, the source base station, and the target base station.

An exemplary embodiment of the present invention provides a method for handover, including: transmitting a handover command message for handover to a target base station to a terminal, by a source base station providing data to the terminal; and continuously transmitting and receiving data to and from the terminal after transmitting the handover command message, by the source base station.

The method for handover may further include: interrupting transmission of the data to the terminal when receiving a message for informing a handover execution timing from the terminal after transmitting the handover command message, by the source base station; and forwarding data on the terminal to the target base station, by the source base station.

The method for handover may further include, before the interrupting of the transmission of the data, transmitting the message for informing the handover execution timing to the source base station, by the terminal receiving the handover command message.

Meanwhile, the method for handover may further include: interrupting transmission of the data to the terminal when receiving a message for informing that the terminal is handed over from the target base station, by the source base station; and forwarding data on the terminal to the target base station, by the source base station.

In this case, the method for handover may further include, before the interrupting of the transmission of the data, immediately executing the handover to the target base station at a handover execution timing, by the terminal; informing that the terminal is handed over, by the target base station, in the case in which the target base station recognizes that the terminal is handed over and does not receive data forwarding related information from the source base station; and forwarding data on the terminal to the target base station, by the source base station.

Meanwhile, the method for handover may further include transferring the message for informing the handover execution timing to the target base station, by the source base station, so that the target base station knows the handover execution timing of the terminal.

The message for informing the handover execution timing may be a handover indication message for notifying the source base station of a determined handover time point after the terminal determines the handover time point, and the handover indication message may be one of a radio resource control (RRC) control message, a media access control (MAC) control message, and a physical (PHY) control signal.

The source base station and the terminal may decide that a time point in which the source base station receives the message for informing the handover execution timing or a time point in which the source base station transmits an ACK for a handover indication message to the terminal is a time point in which the terminal executes the handover.

Meanwhile, the method for handover may further include receiving and setting radio resource setting information for at least one target base station in advance before the terminal transmits a message for informing a handover execution timing after receiving the handover command message.

The method for handover may further include, in the case in which it is possible for the terminal to execute a pre-random access channel (RACH) procedure, executing the pre-RACH procedure to transmit a random access (RA) preamble to the target base station, by the terminal; and receiving an RA response from the target base station by the terminal, the RA response including radio resource setting information.

In this case, the method for handover may further include allowing the terminal to be immediately handed over to the corresponding target base station without executing a random access procedure based on the radio resource setting information at a handover execution timing.

It may be determined that a time point in which the RA response is successfully received depending on success of the pre-RACH procedure is a handover execution timing.

Meanwhile, the method for handover may further include deciding that a time point in which the target base station receives the message for informing the handover execution timing is the handover execution timing of the terminal.

Meanwhile, the method for handover may further include transmitting data or uplink scheduling information to the terminal at a handover execution timing of the terminal, by the target base station, in the case in which the terminal does not execute an RA procedure to the target base station.

Another exemplary embodiment of the present invention provides a method for handover, including: receiving a handover command message for handover to a target base station from a source base station, by a terminal; receiving and setting radio resource setting information for at least one target base station in advance, by the terminal, after receiving the handover command message; transmitting a message for informing a handover execution timing to the source base station, by the terminal; and interrupting connection to the source base station and executing handover to the corresponding target base station based on the radio resource setting information at the handover execution timing, by the terminal.

Yet another exemplary embodiment of the present invention provides a base station for executing handover, including: a transceiver transmitting and receiving signals through an antenna; and a processor connected to the transceiver and executing handover processing, wherein the processor is configured to interrupt transmission of data to a terminal and forward data on the terminal to a target base station, when the processor receives a message for informing a handover execution timing from the terminal after transmitting a handover command message to the terminal through the transceiver.

The processor may be configured to transfer the message for informing the handover execution timing to the target base station through the transceiver so that the target base station knows the handover execution timing of the terminal.

Yet still another exemplary embodiment of the present invention provides a terminal for executing handover, including: a transceiver transmitting and receiving signals through an antenna; and a processor connected to the transceiver and executing handover processing, wherein the processor is configured to receive and set radio resource setting information for at least one target base station in advance after receiving a handover command message from a source base station through the transceiver; transmit a message for informing a handover execution timing to the source base station through the transceiver; and interrupt connection to the source base station and execute handover to the corresponding target base station based on the radio resource setting information at the handover execution timing.

The processor may be configured to execute a pre-RACH procedure to transmit an RA preamble to the target base station through the transceiver and receive an RA response from the target base station, the RA response including radio resource setting information.

It may be determined that a time point in which the RA response is successfully received depending on success of the pre-RACH procedure is the handover execution timing.

DETAILED DESCRIPTION OF THE EMBODIMENTS

Figure 1:
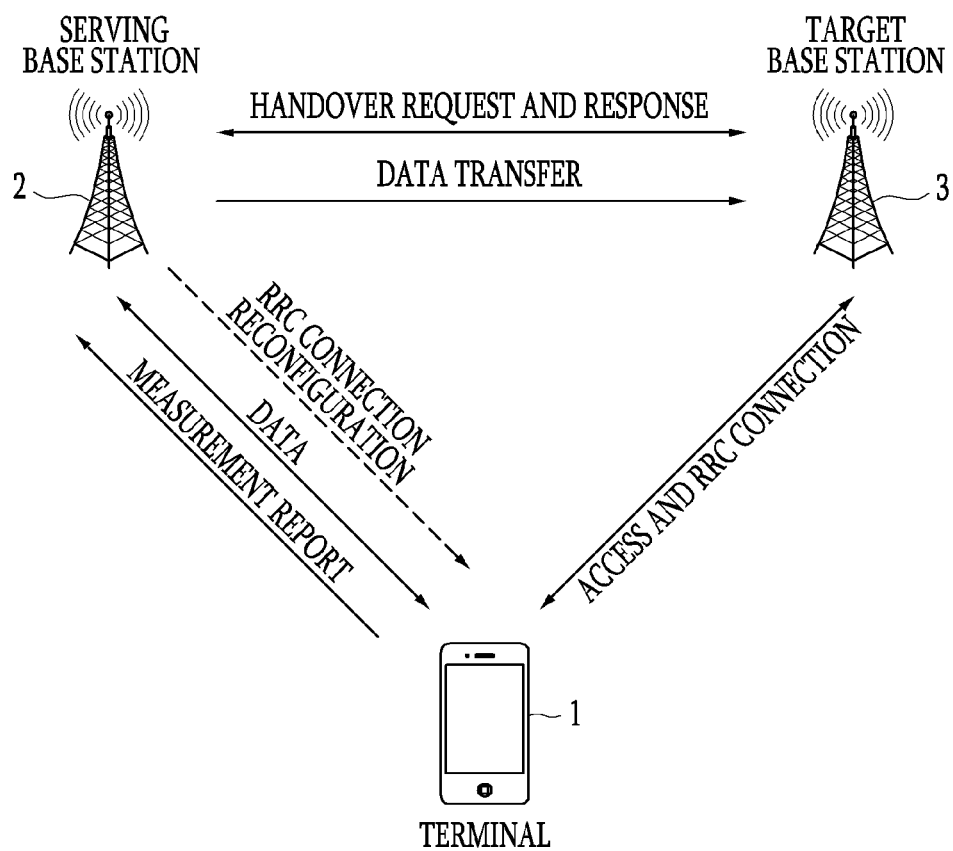
FIG. 1 is a view showing a network environment in which handover is executed according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Throughout the present specification and the claims, unless explicitly described to the contrary, "comprising" any components will be understood to imply the inclusion of other components rather than the exclusion of other components.

Throughout the present specification, a terminal may indicate a user equipment (UE), a mobile terminal (MT), a mobile station (MS), an advanced mobile station (AMS), a high reliability mobile station (HR-MS), a subscriber station (SS), a portable subscriber station (PSS), an access terminal (AT), and the like, and may include all or some of functions of the UE, the MT, the MS, the AMS, the HR-MS, the SS, the PSS, the AT, and the like.

In addition, a base station (BS) may indicate an advanced base station (ABS), a high reliability base station (HR-BS), a node B, an evolved node B, (eNodeB or eNB), an access point (AP), a radio access station (RAS), a base transceiver station (BTS), a mobile multihop relay (MMR)-BS, a relay station (RS) serving as the base station, a relay node (RN) serving as the base station, an advanced relay station (ARS) serving as the base station, a high reliability relay station (HR-RS) serving as the base station, small base stations [femto base station (femto BS), a home node B (HNB), a home eNodeB (HeNB), a pico base station (pico BS), a metro base station (metro BS), a micro base station (micro BS), and the like], and the like, and may include all or some of functions of the eNode, the ABS, the node B, the eNodeB, the eNB the AP, the RAS, the BTS, the MMR-BS, the RS, the RN, the ARS, the HR-RS, the small base stations, and the like.

Hereinafter, a method and an apparatus for handover according to an exemplary embodiment of the present invention will be described.

FIG. 1 is a view showing a network environment in which handover is executed according to an exemplary embodiment of the present invention.

As shown in FIG. 1, in a network environment in which a plurality of small cells are mixed with each other, a terminal (that is, a user equipment (UE)) 1 executes an access to a corresponding cell through base stations taking in charge of each cell. The terminal 1 may execute handover from a source base station (or a source (S)-eNB) (or also referred to as a serving base station) 2 of a cell currently accessed by the terminal 1 to a target base station (or a T-eNB) 3 while being moved.

Figure 2:
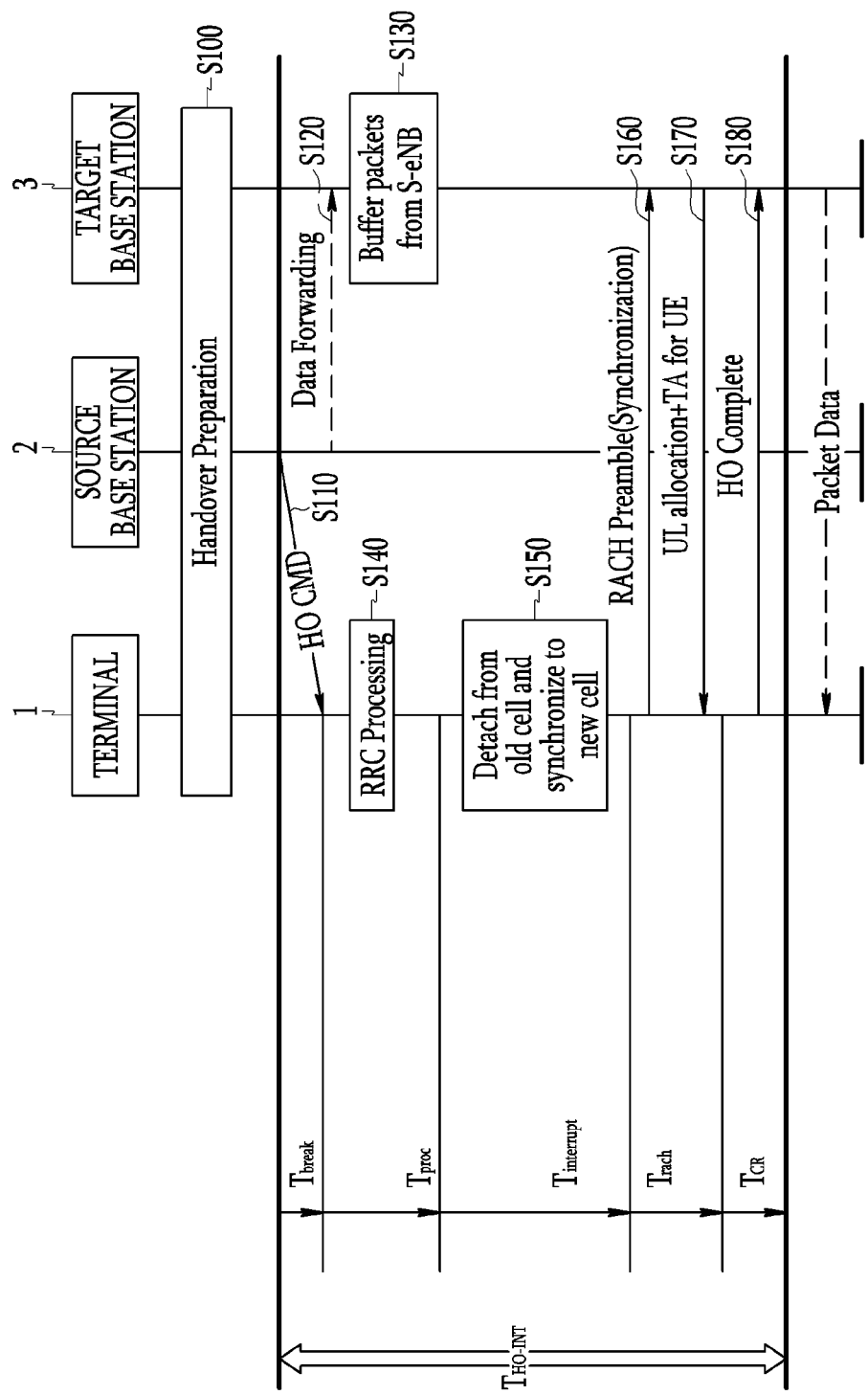
FIG. 2 is a flow chart showing a general handover process.

In this wireless channel environment, handover as shown in FIG. 2 may be executed.

FIG. 2 is a flow chart showing an existing handover process.

When the terminal 1 measures strengths of signals received from the source base station 2 and the neighbor base stations and transmits channel state information of a serving cell and the neighbor cells to the source base station 2 through a measurement report message, the source base station 2 determines whether or not to execute handover for the terminal and transmits a message for commanding the handover to the terminal (S100). In this case, the source base station 2 interrupts transmission of data to the terminal 1 and forwards data to the target base station 3 (S120) while transmitting a handover command message HO command (S110). The target base station 3 receives the forwarded data, and stores the received data in a buffer (S130).

The terminal 1 receives and processes the handover command message (S140), and detaches wireless connection to the source base station 2 and attempts to access the target base station 3 depending on the received handover command message (S150). The terminal 1 transmits a random access (RA) preamble to the target base station (S160), and transmits a handover complete message HO complete to the target base station 3 (S180) after it receives a random access response (uplink resource allocation UL allocation and timing alignment (TA) information) from the target base station 3 (S170). The target base station 3 receives the handover complete message and then transmits data to the terminal 1 (S170).

At the time of this handover, data interruption occurs from a time point in which the terminal detaches the wireless connection to the source base station and attempts to access the target base station until the terminal first receives the data from the target base station. A data interruption time may be a time from a time point in which the source base station interrupts the transmission of the data to the terminal while transmitting the handover command message to a time point in which the target base station transmits the data to the terminal after receiving the handover complete message.

Figure 3:
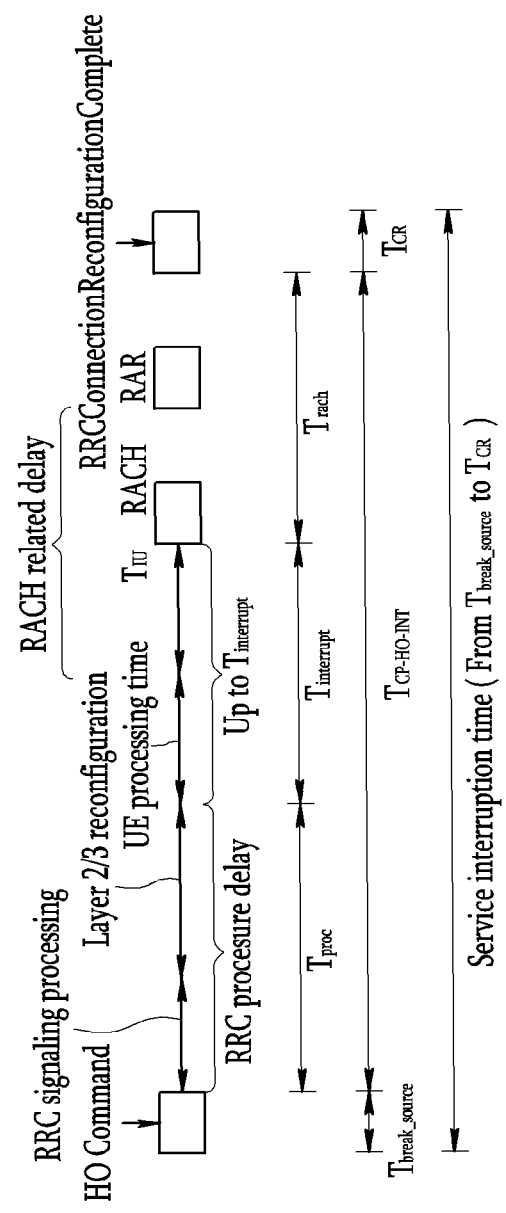
FIG. 3 is a view showing a data interruption time.

FIG. 3 is a view showing a data interruption time.

The data interruption time may be represented as follows.

$$T_{UP\text{-}HO\text{-}INT} = T_{break\_source} + T_{proc} + T_{interrupt} + T_{rach} + T_{CR} \quad \text{[equation 1]}$$

Here, $T_{break\_source}$ represents a time required for the source base station to interrupt the transmission of the data to the terminal while transmitting the handover command message to the terminal and for the terminal to receive the handover command message. $T_{proc}$ represents a time required for the terminal to process the received handover command message. $T_{interrupt}$ represents a time required for the terminal to execute pre-processing (for example, tuning a radio frequency (RF)/a base band, downlink (DL) synchronization, waiting random access channel (RACH) opportunity, or the like) in order to access the target base station. $T_{rach}$ represents a time required for the terminal to transmit the RA preamble to the target base station and receive a random access (RA) response from the target base station. $T_{CR}$ represents a time required for the target base station to receive the handover complete message from the terminal and first transmit the data to the terminal and for the terminal to receive the corresponding data, for the purpose of contention resolution.

In an exemplary embodiment of the present invention, time point in which the terminal and the base station interrupt the data become the same as each other in order to decrease the data interruption time.

Figure 4:
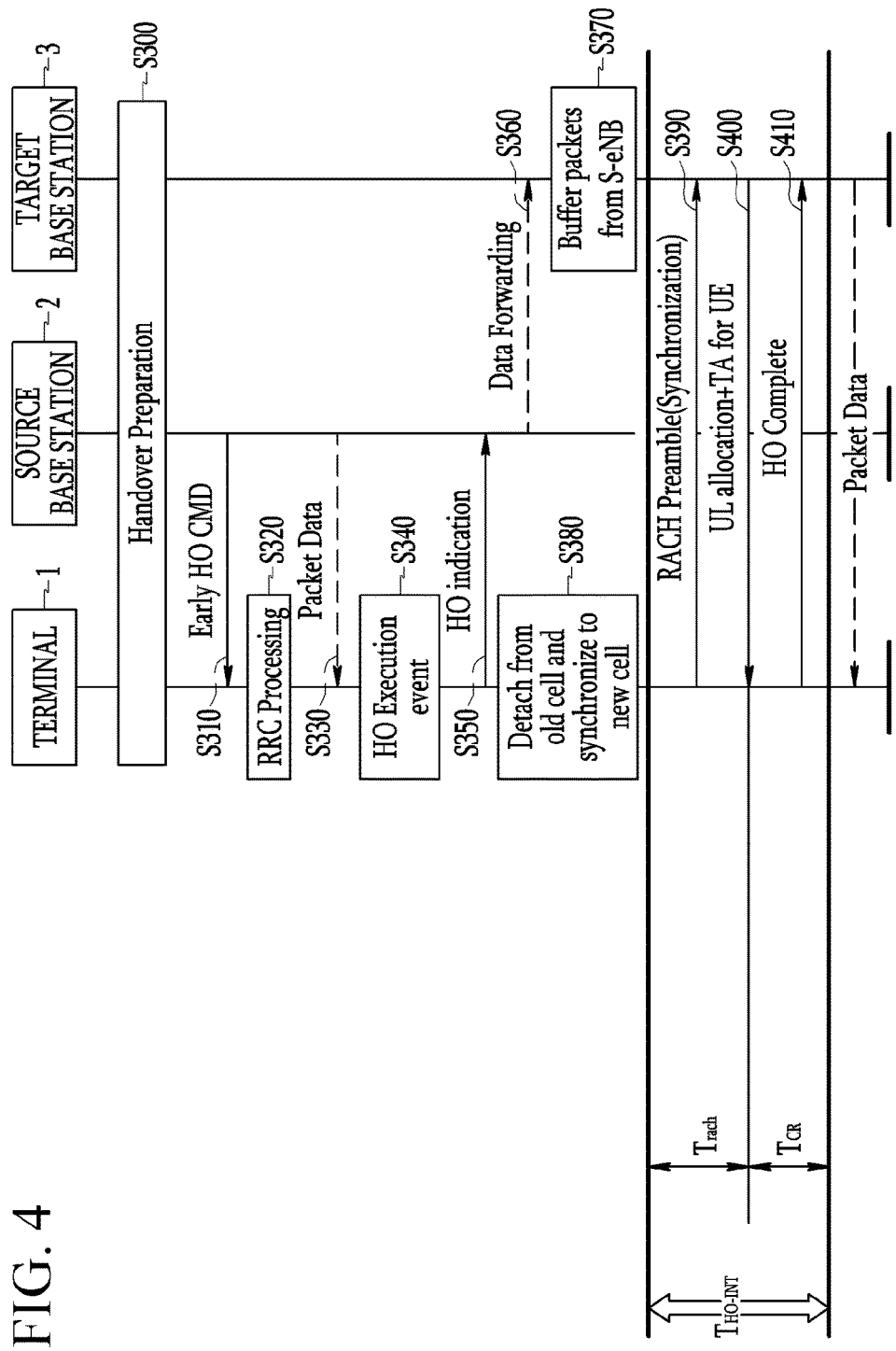
FIG. 4 is a flow chart showing a method for handover according to a first exemplary embodiment of the present invention.

FIG. 4 is a flow chart showing a method for handover according to a first exemplary embodiment of the present invention.

In a first exemplary embodiment of the present invention, the source base station does not immediately interrupt the transmission of the data to the terminal while transmitting the handover command message, but interrupts the transmission of the data to the terminal when the source base station receives a message for informing a handover execution timing from the terminal after transmitting the handover command message. As the message for informing the handover execution timing, a message for informing a handover execution timing determined by the terminal, that is, a handover indication message HO indication may be used. Hereinafter, the method for handover according to a first exemplary embodiment of the present invention will be described with reference to an example in which the handover indication message HO indication is used as the message for informing the handover execution timing.

As shown in FIG. 4, the source base station 2 determines whether or not to execute handover for the terminal (S300), and transmits a message commanding the handover to the terminal (S310). In this case, the source base station 2 maintains transmission of data to the terminal 1 without interrupting the transmission of the data to the terminal 1 while transmitting a handover command message.

The terminal 1 receives and processes the handover command message (S320). Also in this case, the terminal 1 receives data from the source base station 2 (S330) while the transmission of the data of the source base station 2 is continuously maintained.

The terminal 1 determines a handover execution timing, and then transmits a handover indication message HO indication for informing the handover execution timing to the source base station 2 (S340 and S350). For example, the terminal 1 may determine that a specific time point after it receives the handover command message is the handover execution timing or determine that a case in which a handover execution event occurs is the handover execution timing. For example, in the case in which a preset handover execution event (for example, a time point in which the terminal completes downlink synchronization with the target base station in the case in which a strength of a signal of the target base station is larger than that of a signal of the source base station for a predetermined time) occurs, the terminal 1 determines the handover execution timing. The handover indication message may include information on the target base station determined by the terminal. Since the terminal 1 may continuously receive the data from the source base station 2 up to this time, data interruption does not occur.

When the source base station 2 receives the handover indication message HO indication, the source base station 2 forwards data to the target base station 3 (S360), and interrupts the transmission of the data to the terminal 1. The source base station 2 decides that a time point in which it receives the handover indication message HO indication is the handover execution timing in which the terminal executes the handover, and interrupts the transmission of the data to the terminal. In this case, the source base station 2 transmits an information transfer message (for example, an SN Status Transfer) to the target base station 3, and the information transfer message includes data sequence number information, data, and the like. The target base station 3 stores the forwarded data in a buffer (S370).

The terminal 1 transmits the handover indication message HO indication, and then executes the handover to the target base station. That is, the terminal 1 detaches wireless connection to the source base station 2, and attempts to access the target base station 3 (S380). The terminal 1 transmits an RA preamble to the target base station (S390), and transmits a handover complete message HO complete to the target base station (S410) after it receives a random access response from the target base station (S400).

At the time of the handover according to an exemplary embodiment of the present invention described above, a data interruption time may be represented as follows.

$$T_{UP\text{-}HO\text{-}INT} = T_{rach} + T_{CR}$$ [equation 2]

Here, $T_{rach}$ represents a time required for the terminal to transmit the RA preamble to the target base station and receive the RA response from the target base station. $T_{CR}$ represents a time required for the target base station to receive the handover complete message from the terminal and first transmit the data to the terminal and for the terminal to receive the corresponding data, for the purpose of contention resolution.

$T_{break\_source}$ and $T_{proc}$ can be set to "0", as compared with the related art. Particularly, in the case in which the terminal transmits a message through media access control (MAC) layer signaling, $T_{break\_source}$ may be accurately set to 0 ms.

As described above, as compared with the related art in which the source base station interrupts the transmission of the data to the terminal while transmitting the handover command message, in an exemplary embodiment of the present invention, even though the source base station transmits the handover command message, the source base station does not interrupt the transmission of the data to the terminal, but interrupts the transmission of the data to the terminal when the source base station receives the handover indication message later from the terminal, thereby making it possible to significantly decrease the data interruption time.

Figure 5:
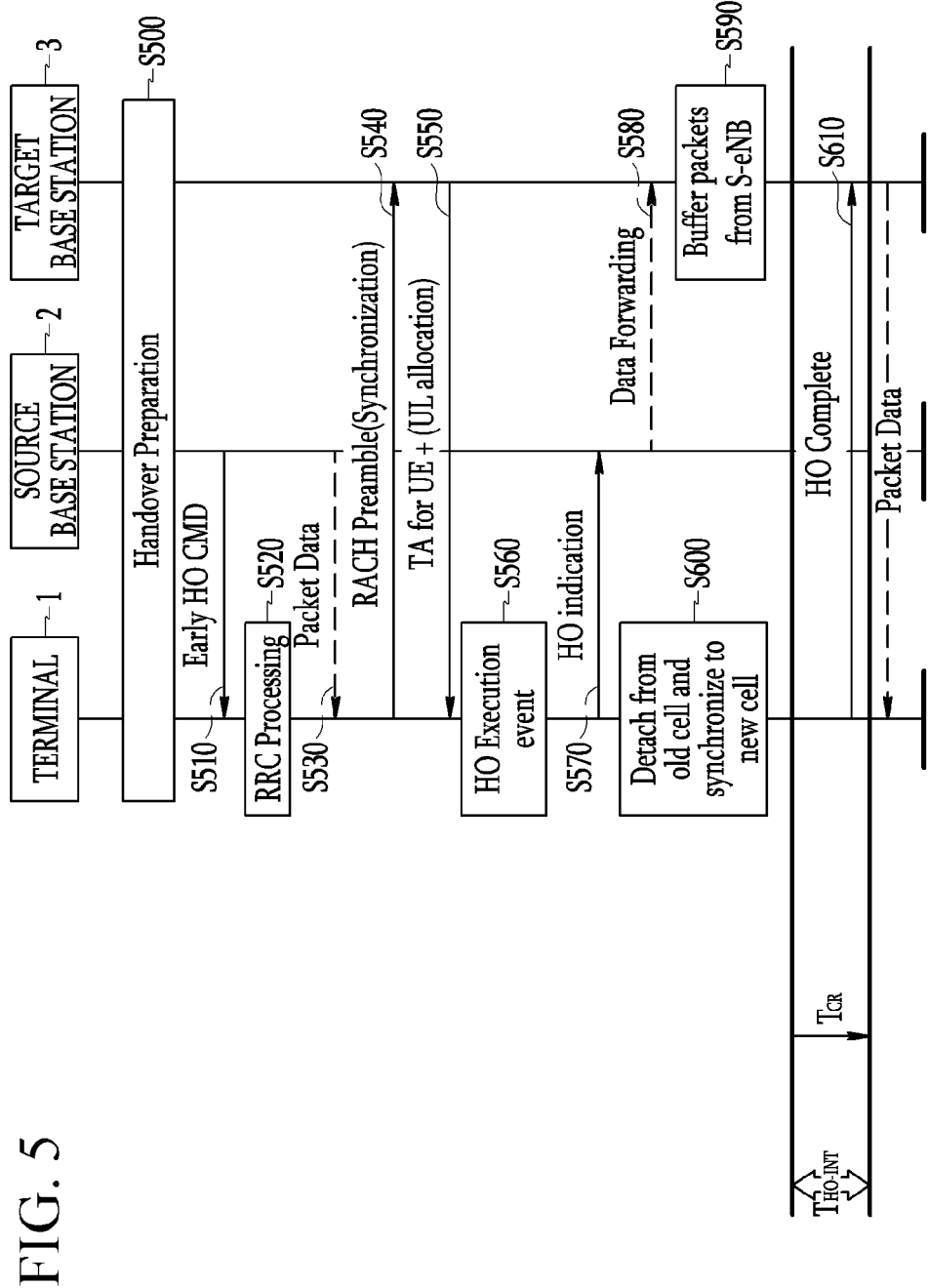
FIG. 5 is a flow chart showing a method for handover according to a second exemplary embodiment of the present invention.

FIG. 5 is a flow chart showing a method for handover according to a second exemplary embodiment of the present invention.

Also in a second exemplary embodiment of the present invention, the source base station does not immediately interrupt the transmission of the data to the terminal while transmitting the handover command message, but interrupts the transmission of the data to the terminal when the source base station receives a message for informing a handover execution timing from the terminal after transmitting the handover command message. The message for informing the handover execution timing may be the message as described in the above-mentioned first exemplary embodiment. Particularly, in a second exemplary embodiment of the present invention, radio resource setting information for a target cell may be preset so that the terminal may immediately execute the handover after transmitting the message for informing the handover execution timing to the source base station, in order to further decrease the data interruption time. Therefore, a RACH-less or a pre-RACH is applied to the handover to decrease the data interruption time. The RACH-less represents a case in which an RA procedure is not required when the terminal executes the handover to the target base station, and the pre-RACH representing that the terminal sets the radio resource setting information of the target base station in advance before executing the handover represents a case in which an RA procedure is not required at a time point in which the terminal substantially executes the handover to the target base station by executing the RA procedure to the target base station in advance before executing the handover to the target base station. In the case in which the RACH-less is applied, an RACH preamble procedure in which the terminal transmits a preamble and uplink (UL) resource allocation and timing alignment (TA) procedures depending on an RA response transmitted from the target base station to the terminal can be omitted.

In detail, as shown in FIG. 5, the source base station 2 determines whether or not to execute handover for the terminal (S500), and transmits a message commanding the handover to the terminal (S510). In this case, the source base station 2 maintains transmission of data to the terminal 1 without interrupting the transmission of the data to the terminal 1 while transmitting a handover command message.

The terminal 1 receives and processes the handover command message (S520). Also in this case, the terminal 1 still receives data from the source base station 2 (S530). The terminal 1 executes a pre-RACH procedure to the target base station 3. That is, the terminal 1 transmits an RA preamble to the target base station (S540), and receives an RA response from the target base station 3 (S550). Also in this case, the source base station 2 maintains the transmission of the data to the terminal 1 without interrupting the transmission of the data to the terminal 1.

After the terminal 1 executes the pre-RACH procedure, the terminal 1 transmits a handover indication message HO indication for informing a handover execution timing to the source base station 2 (S560 and S570). As described in a first exemplary embodiment, the terminal 1 may determine that a specific time point after it receives the handover command message is the handover execution timing or determine that a case in which a handover execution event occurs is the handover execution timing. The handover indication message may include information on the target base station determined by the terminal. In addition, the terminal 1 may determine that a time point in which the pre-RACH procedure is successfully completed is the handover execution timing.

When the source base station 2 receives the handover indication message HO indication, the source base station 2 forwards data to the target base station 3 (S580), and interrupts the transmission of the data to the terminal 1. The source base station 2 decides that a time point in which it receives the handover indication message HO indication is the handover execution timing in which the terminal executes the handover, and interrupts the transmission of the data to the terminal. In this case, the source base station 2 transmits an information transfer message (for example, an SN Status Transfer) to the target base station 3, and the information transfer message includes data sequence number information, data, and the like. The target base station 3 stores the forwarded data in a buffer (S590).

The terminal 1 transmits the handover indication message HO indication, and then executes the handover to the target base station. That is, the terminal 1 detaches wireless connection to the source base station 2, and accesses the target base station 3 (S600). Since the pre-RACH procedure was executed in S540 and S550, the terminal does not execute an additional RA procedure. Meanwhile, when the data of the terminal are forwarded from the source base station 2 to the target base station 3, the target base station 3 transmits data to the terminal 1 (S610).

The terminal 1 may preset radio resource setting information for one or more target cells. Therefore, the terminal 1 may immediately execute the handover after transmitting the message for informing the handover execution timing to the source base station. That is, the terminal immediately executes handover to a target cell by activating only the preset radio resource setting information of the target cell at the handover execution timing.

Meanwhile, in the case in which the terminal does not need to execute the RA procedure as described above, the target base station 3 may transmit the data to the terminal or transmit uplink scheduling information to transmit a handover complete message to the terminal immediately at the handover execution timing of the terminal At the time of the handover according to an exemplary embodiment of the present invention as described above, a data interruption time may be represented as follows.

$$T_{UP\text{-}HO\text{-}INT} = T_{CR} \qquad \text{[equation 3]}$$

Here, $T_{CR}$ represents a time required for the target base station to receive the handover complete message from the terminal and first transmit the data to the terminal and for the terminal to receive the corresponding data, for the purpose of contention resolution. Additionally, in the case in which the target base station transmits downlink data immediately at a time point in which the terminal executes the handover, $T_{CR}$ may be set to 0, and the data interruption time during the handover may be completely removed.

As described above, as compared with the related art in which the source base station interrupts the transmission of the data to the terminal while transmitting the handover command message, in an exemplary embodiment of the present invention, even though the source base station transmits the handover command message, the source base station does not interrupt the transmission of the data to the terminal, but interrupts the transmission of the data to the terminal when the source base station receives the handover indication message later from the terminal, and the terminal immediately accesses the target base station to receive the data without executing the RA procedure by the pre-RACH procedure executed before the transmission of the data is interrupted in a state in which the source base station interrupts the transmission of the data to the terminal, thereby making it possible to significantly decrease the data interruption time.

In the exemplary embodiments of the present invention described above, the source base station 2 may transfer the handover indication message HO indication received from the terminal 1 to the target base station 3, if necessary. In this case, the target base station 3 may decide that a time point in which it receives the handover indication message HO indication, which is the message for informing the handover execution timing of the terminal, is the handover execution timing in which the terminal executes the handover.

In addition, in a first exemplary embodiment, the handover execution timing is determined depending on a PRACH occasion in the target base station, thereby making it possible to set a time required for waiting for the PRACH occasion in the target base station to be less than 1 subframe so as to be close to 0. For example, $T_{IU}$ in the data interruption time $T_{interrupt}$ at the time of the handover may be set to 0 ms. For example, in the case of the PRACH occasion is set in an even subframe subframe 1 of even subframes, the terminal may immediately transmit the RA preamble to the target base station in the even subframe subframe 1.

In addition, the terminal 1 may transmit data information received from the source base station 2 together with the handover indication message HO indication when transmitting the handover indication message HO indication to the source base station 2, in order to decrease data duplication. In this case, the terminal 1 may transmit a predetermined message (a radio link control (RLC) status protocol data unit (PDU) or a packet data convergence protocol (PDCP) status report) including the data information. In addition, the source base station 2 may transmit a handover indication acknowledgement (ACK) message as an acknowledgement message for the handover indication message HO indication to the terminal 1. In this case, the source base station 2 may transmit the predetermined message (the RLC status PDU or the PDCP status report) including the data information received from the terminal together with the handover indication ACK message.

Meanwhile, in the exemplary embodiment of the present invention described above, the handover indication message may be transmitted by a method for notifying the source base station of the execution of the handover using a media access control (MAC) control element, a method for notifying the source base station of the execution of the handover using a radio resource control (RRC) message, a method for notifying the source base station of the execution of the handover using a physical (PHY) channel, or the like. That is, the handover indication message may be one of an MAC control message, an RRC control message, and a PHY control signal. In addition, the terminal and the source base station may decide that a time point in which the source base station receives the handover indication message or a time point in which the source base station transmits the ACK for the handover indication message to the terminal is the handover execution timing in which the terminal executes the handover.

At the time of the handover as described above, the terminal informs a time point in which it executes the handover from the source base station to the target base station, and the source base station forwards the data to the target base station or transfers the handover indication message to the target base station, such that all of the terminal, the source base station, and the target base station may know the handover execution timing of the terminal. In addition, the terminal detaches the connection to the source base station after transmitting the handover indication message, and the source base station receives the handover indication message and interrupts the transmission of the data to the terminal, such that time point in which the terminal and the base station interrupt the data become the same as each other.

The terminal may immediately execute the handover in the case in which the terminal fails to transmit the handover indication message or may immediately execute the handover without transmitting the handover indication message. In this case, the target base station may not receive data forwarding related information from the source base station. In this case, as the terminal is handed over to the target base station, the target base station informs the source base station that the terminal is handed over, and the source base station may interrupt the transmission of the data to the terminal, forward the data to the target base station, and transfer the SN stature transfer message to the target base station.

Figure 6:
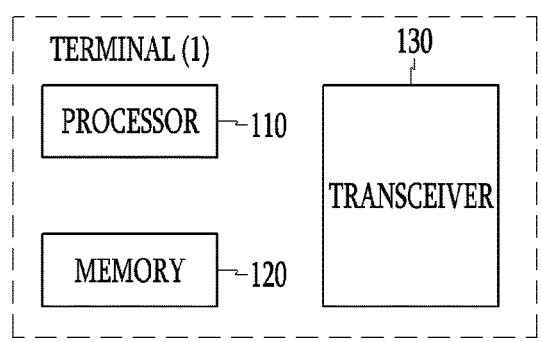
FIG. 6 is a block diagram of a terminal according to an exemplary embodiment of the present invention.

FIG. 6 is a block diagram of a terminal according to an exemplary embodiment of the present invention.

As shown in FIG. 6, the terminal 1 according to an exemplary embodiment of the present invention includes a processor 110, a memory 120, and a transceiver 130. The processor 110 may be configured to implement the methods described with reference to FIG. 4 or FIG. 5.

The memory 120 is connected to the processor 110, and stores various kinds of information related to operations of the processor 110 therein. The memory 120 may store instructions that are to be executed in the processor 110 therein or load and temporally store instructions from a storage (not shown) therein. The processor 110 may execute the instructions stored or loaded in the memory 120. The processor 110 and the memory 120 are connected to each other through a bus (not shown), and input and output interfaces (not shown) may also be connected to the bus.

Figure 7:
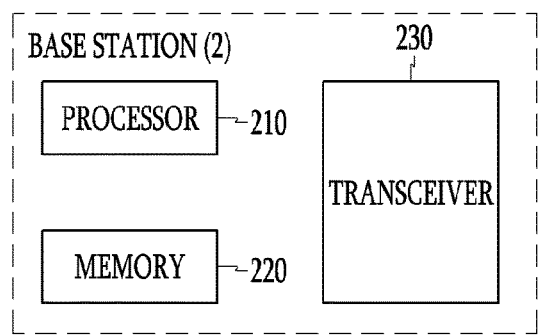
FIG. 7 is a block diagram of a base station according to an exemplary embodiment of the present invention.

FIG. 7 is a block diagram showing a base station according to an exemplary embodiment of the present invention.

As shown in FIG. 7, the base station 2 according to an exemplary embodiment of the present invention includes a processor 210, a memory 220, and a transceiver 230.

The processor 210 may be configured to implement the methods described with reference to FIG. 4 or FIG. 5.

The memory 220 is connected to the processor 210, and stores various kinds of information related to operations of the processor 210 therein. The memory 220 may store instructions that are to be executed in the processor 210 therein or load and temporally store instructions from a storage (not shown) therein.

The processor 210 may execute the instructions stored or loaded in the memory 220. The processor 210 and the memory 220 are connected to each other through a bus (not shown), and input and output interfaces (not shown) may also be connected to the bus.

According to an exemplary embodiment of the present invention, at the time of the handover, all of the terminal, the source base station, and the target base station may know the time point in which the terminal executes the handover from the source base station to the target base station, such that the time point in which the terminal and the base station interrupt the data become the same as each other.

Therefore, the data interruption time in which the data are interrupted during the handover may be decreased without wasting radio resources during a period in which the terminal executes the handover, thereby making it possible to improve communication quality.

The exemplary embodiments of the present invention described above are not implemented through only the apparatus and/or the method described above, but may also be implemented through programs executing functions corresponding to configurations of the exemplary embodiments of the present invention, a recording medium in which the programs are recorded, and the like. In addition, these implementations may be easily made by those skilled in the art to which the present invention pertains from the exemplary embodiments described above.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for handover, comprising:
receiving, by a terminal, a handover command message for handover to a target base station from a source base station;
determining, by the terminal, a handover execution time after receiving the handover command message;
transmitting, by the terminal, a message for informing of the handover execution time to the source base station so that the target base station recognizes the determined handover execution time via the source base station;
transmitting and receiving, by the terminal, data to and from a serving base station while maintaining connection with the serving base station until the handover execution time; and
executing, by the terminal, the handover into the target base station at the handover execution time,
wherein the handover execution time is determined based on a time point of a first available uplink transmission to the target base station, and
wherein the time point of the first available uplink transmission is a time point at which a random access preamble transmission to the target base station is possible or a time point at which uplink data transmission to the target base station is possible.

2. The method of claim 1, wherein the receiving of the handover command message comprises obtaining a physical random access channel (PRACH) occasion indicating subframe information for random access (RA) preamble transmission to the target base station, and
wherein the determining of the handover execution time comprises determining a time at which preamble transmission is possible based on PRACH occasions as the handover execution time.

3. The method of claim 1, further comprising:
after the receiving of the handover command message,
performing, by the terminal, a pre-random access channel (Pre-RACH) procedure to transmit the RA preamble to the target base station; and
receiving, by the terminal, a random access response from the target base station, the random access response including radio resource setting information for uplink data transmission,
wherein the determining of the handover execution time determines a time point at which uplink data transmission to the target base station is possible based on the radio resource setting information as the handover execution time.

4. The method of claim 1, wherein the receiving of the handover command message comprises obtaining uplink synchronization information for the target base station and radio resource setting information for uplink data transmission to the target base station without an RA procedure to the target base station,
wherein the determining of a handover execution time determines a time point at which uplink data transmission to the target base station is possible based on the uplink synchronization information and the radio resource setting information as the handover execution time when there is no need of the RA procedure to the target base station.

5. The method of claim 1, wherein the source base station stops sending the data to the terminal and forwards the data of the terminal to the target base station when receiving the message for informing of the handover execution time.

6. The method of claim 1, wherein the source base station stops sending the data to the terminal and forwards the data of the terminal to the target base station when receiving, from the target base station, a message for informing that the terminal is handed over.

7. The method of claim 1, wherein the source base station decides that a time point at which the source base station receives the message for informing of the handover execution time or a time point at which the terminal receives an ACK for a handover indication message from the source base station is a time point at which the terminal executes the handover.

8. A method for handover, comprising:
obtaining, by a target base station, radio resource control (RRC) context information of a terminal through a handover preparation procedure with a source base station;
receiving, by the target base station, a preamble for random access from the terminal;
transmitting, by the target base station, a random access response including radio resource setting information for uplink data transmission to the terminal;
receiving, by the target base station, a message for informing of a handover execution time determined by the terminal from the source base station; and
transmitting, by the target base station, uplink scheduling information for handover completion message transmission or data at the handover execution time of the terminal.

9. The method of claim 8, wherein the target base station decides that a time point at which the target base station receives the message for informing of the handover execution time is the handover execution time of the terminal.

10. The method of claim 8, further comprising:
transmitting, by the target base station, a message for informing that the terminal is handed over to the target base station to the source base station when recognizing that the terminal is handed over to the target base station and not receiving information related to data forwarding.

11. The method of claim 8, wherein the terminal and the source base station decide that a time point at which the source base station receives the message for informing of the handover execution time or a time point at which the terminal receives an ACK for a handover indication message from the source base station is a time point at which the terminal executes the handover.

12. A terminal for executing handover, comprising:
a transceiver transmitting and receiving signals through an antenna; and
a processor connected to the transceiver and executing handover processing,
wherein the processor is configured to
receive a handover command message for handover to a target base station from a source base station through the transceiver;
determine a handover execution time after receiving the handover command message;
transmit a message for informing of the handover execution time to the source base station through the transceiver so that the target base station recognizes the determined handover execution time via the source base station;
transmit and receive data to and from the serving base station through the transceiver while maintaining connection with the serving base station until the handover execution time; and
execute a handover into the target base station at the handover execution time,
wherein the handover execution time is determined based on a time point of a first available uplink transmission to the target base station, and
wherein the time point of the first available uplink transmission is a time point at which a random access preamble transmission to the target base station is possible or a time point at which uplink data transmission to the target base station is possible.

13. The terminal of claim 12, wherein:
the processor is configured to obtain a physical random access channel (PRACH) occasion indicating subframe information for random access (RA) preamble transmission to the target base station through the transceiver, and determine a time at which preamble transmission is possible based on the PRACH occasion as the handover execution time.

14. The terminal of claim 12, wherein:
the processor is configured to perform a pre-random access channel (Pre-RACH) procedure to transmit the RA preamble to the target base station through the transceiver before determining the handover execution time, and receive a random access response from the target base station, the random access response including radio resource setting information for uplink data transmission, and
wherein a time point at which uplink data transmission to the target base station is possible based on the radio resource setting information is determined as the handover execution time.

15. The terminal of claim 14, wherein:
the processor is configured to determine a time point at which uplink data transmission to the target base station is possible according to success of the Pre-RACH procedure as the handover execution time.

16. The terminal of claim 12, wherein:
the processor is configured to determine a time point at which uplink data transmission to the target base station is possible based on pre-obtained uplink synchronization information and pre-obtained radio resource setting information as the handover execution time when there is no need of a RA procedure to the target base station.

* * * * *